US005730037A

United States Patent [19]
Manning

[11] Patent Number: 5,730,037
[45] Date of Patent: Mar. 24, 1998

[54] MULTI-SPINDLE MACHINE CONTROL SYSTEMS

[75] Inventor: Tim Manning, Eldora, Iowa

[73] Assignee: Logan Clutch Corporation, Cleveland, Ohio

[21] Appl. No.: 423,238

[22] Filed: Apr. 17, 1995

[51] Int. Cl.⁶ .................................. B23B 13/04; B23B 5/08
[52] U.S. Cl. ............................... 82/118; 82/129; 408/5
[58] Field of Search ........................... 82/118, 129, 119; 364/474.01, 474.02, 474.12; 408/5; 74/813 R, 813 C, 814; 192/129 A

[56] References Cited

U.S. PATENT DOCUMENTS

| | | | |
|---|---|---|---|
| 2,528,565 | 11/1950 | Weber | 192/133 |
| 2,794,528 | 6/1957 | King | 192/133 |
| 3,760,661 | 9/1973 | Eichenhofer | 82/2.7 |
| 3,894,452 | 7/1975 | Kazik et al. | 82/118 X |
| 3,913,429 | 10/1975 | Uchida et al. | 82/118 |
| 4,120,583 | 10/1978 | Hyatt | 355/86 |
| 4,279,013 | 7/1981 | Cameron et al. | 364/474.1 |
| 4,817,007 | 3/1989 | New | 82/118 X |
| 5,107,435 | 4/1992 | Yamada | 364/474 |
| 5,107,730 | 4/1992 | Muraki et al. | 82/118 |
| 5,181,442 | 1/1993 | Nezu | 82/118 X |
| 5,212,648 | 5/1993 | Sugita et al. | 82/118 X |
| 5,358,058 | 10/1994 | Edlund et al. | 175/24 |

*Primary Examiner*—Daniel W. Howell
*Assistant Examiner*—Henry Tsai
*Attorney, Agent, or Firm*—Ralph E. Jocke

[57] ABSTRACT

The machine control system for a multi-spindle machine (10) includes a controller (42). The controller is operative to avoid machine down time by shutting down operation of the main drive motor (12) of the multi-spindle machine responsive to malfunctions as detected by a plurality of sensors. A controller is also readily programmable to modify the high and low shift points to optimize cycle times. The controller is further connectable to an administrative workstation (188) which includes a database (190) for producing a variety of analytical reports related to performance of the machine.

20 Claims, 9 Drawing Sheets

MULTI-SPINDLE MACHINE CONTROL SYSTEMS

TECHNICAL FIELD

This invention relates to multi-spindle machines. Specifically this invention relates to a controller and control system for a multi-spindle machine that enables higher production rates and avoids down time.

BACKGROUND ART

Multi-spindle machines are known in the prior art. Multi-spindle machines are used to mass produce standardized types of components. A multi-spindle machine typically has several workstations at which machining operations are performed. A piece of raw stock, such as bar stock, enters the machine at a first station and as the machine indexes, various machining operations are performed. Once this station has indexed completely through the machine a completed part is formed. The part is released and the process is repeated with a new piece of raw stock. An advantage of multi-spindle machines is that all stations in the machine are producing parts simultaneously, resulting in high production.

Multi-spindle machines typically have a large indexing drum with four, six or eight stations thereon. Each of the stations carries a work piece. In all but one of the stations, where a new piece of stock enters, a machining operation is performed. After each operation is completed the drum is rotated so that each work piece moves sequentially through the location where the various operations are performed. The machining operations typically performed in a multi-spindle machine include milling, turning and threading.

While multi-spindle machines are very efficient in terms of producing standardized parts at a high rate they also have drawbacks. The primary drawback associated with multi-spindle machines is that the entire machine operates off of a single main motor. The main motor drives all of the devices within the machine. All of these devices perform their operations simultaneously. There is always a risk that one of the mechanisms within the machine will malfunction. If such a malfunction should occur and not be detected by an operator in time to shut the machine off, the machine will continue with its next cycle. In many cases an attempt by the machine to index to its next position will cause severe damage. This is why it is common for a human operator to be required to closely monitor multi-spindle machines.

Another drawback associated with multi-spindle machines is that typically the machines must change from high to low speed and back again during the course of their operating cycle. High speed is typically used for times in the machine cycle when critical machining operations are not occurring. High speed operation is desirable is when the stations are indexing or when tools are moving toward or away from the work pieces but are not performing work thereon. Low speed operation is used when the tools in the machine are forming the metal. Any attempt to operate the machine in high speed when such forming work is being performed is likely to cause a problem or even jam up of the machine.

It is the responsibility of the operator or set up technician to set the points in the machine cycle where the machine makes its high speed and low speed shifts. Shifting from high to low speed too early however may result in slower cycle times and production rates. The same result may occur if the shift from low to high speed is made too late. However as previously discussed if the shift from high to low speed is made too late (or the shift from low to high too early) damage to the machine, the tooling or the work pieces may result.

In the past machines have been controlled using cam mechanisms that do not provide for precise settings. Further, when a machine is changed to manufacture a different type of part, the times in the operating cycle for making the high and low speed shifts may also be optimally changed. However finding the optimum time to make these changes is often difficult and as a result the machines are set to run at lower cycle times to avoid excessive tinkering.

Other problems associated with multi-spindle machines include a tendency for operators to waste energy by having systems such as air blow offs for chips, fume and oil mist collection systems and coolant filtration systems operating even when the machine is not in service. This presents a substantial waste of energy and money.

A further common problem related to existing multi-spindle machines is that the operator or technician who may need to observe the operation of the machine from various positions about the machine may encounter difficulty in reaching the controls. This greatly impedes the ability to perform accurate set up.

A further problem with multi-spindle machines is that it is difficult to collect accurate data concerning the rate at which parts are made as well as the difficulty in monitoring tool life (and tool costs) associated with producing parts. It is also difficult to monitor the productivity of operators of such machines.

Thus there exists a need for a control system for a multi-spindle machine that increases productivity, minimizes down time and enables the more effective operation and monitoring of production.

DISCLOSURE OF INVENTION

It is an object of the present invention to provide a multi-spindle machine that includes a control system that optimizes machine performance.

It is a further object of the present invention to provide a multi-spindle machine with a control system that minimizes the risk of damage to the machine in the event of a malfunction.

It is a further object of the present invention to provide a multi-spindle machine with a control system that increases production rates.

It is a further object of the present invention to provide a multi-spindle machine with a control system that enables operation of the machine from multiple locations on the machine.

It is a further object of the present invention to provide a multi-spindle machine with a control system that enables the capture of data related to production at an administrative workstation that provides an accurate assessment of productivity and costs.

Further objects of the present invention will be made apparent in the following Best Modes For Carrying Out Invention and the appended claims.

The foregoing objects of the present invention are accomplished by a multi-spindle machine that includes a dedicated programmable controller. The programmable controller includes a user interface that has a display and key pad as well as other controls and button inputs. The controller includes a processor that is connected through an input-output interface to a number of sensors mounted on the machine. In the event a failure or fault condition is detected by one of the sensors the controller is operative to shut down the main motor of the machine to prevent further damage and to display the cause of the malfunction on its display.

The preferred form of the invention includes a controller on each side of the multi-spindle machine. The controllers are connected through a serial interface which minimizes the amount of wiring interconnecting the two controllers. Each controller has an actuator that enables that particular controller to take control over the other. This enables the operator to adjust parameters of the machine operation from either controller.

The controllers also communicate through an interface to an administrative workstation which may be located in a production office or other remote location. The administrative workstation captures data input to the controller, such as the job number, operator, elapsed time, number of parts produced and other parameters. The administrative workstation may be used to produce production tickets which are kept with each batch of parts for purposes of tracking and quality control. In addition the administrative workstation includes a database which stores and correlates various parameters associated with making a particular part. By manipulating the data stored in the database the actual costs to produce the parts may be determined. Such information is particularly useful to determine the profitability of manufacturing a particular part and to quote the making of such parts in the future.

BEST MODES FOR CARRYING OUT INVENTION

Figure 1:
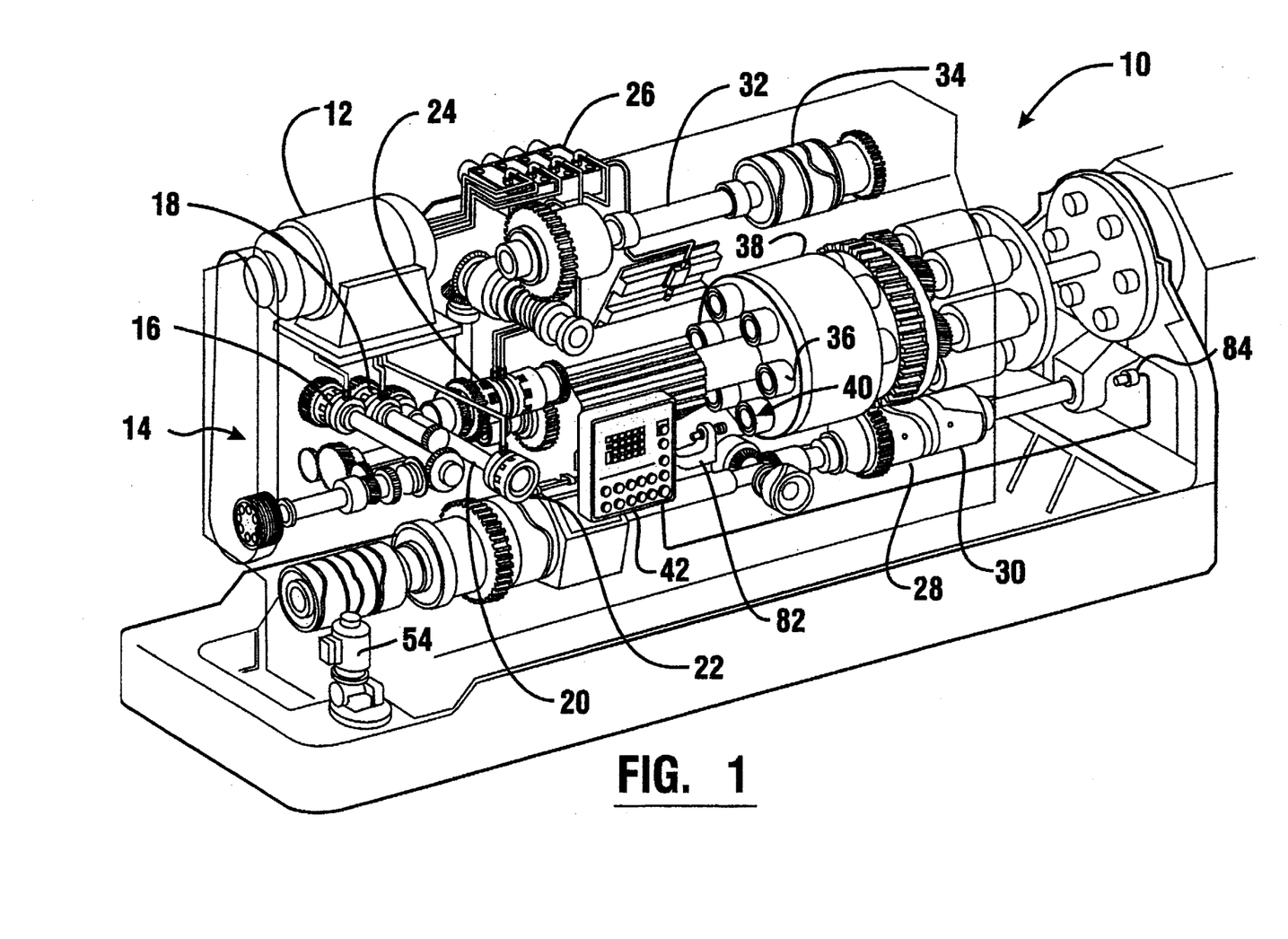
FIG. 1 is a transparent isometric partial view of the multi-spindle machine incorporating the machine control system of the preferred embodiment of the present invention.

Referring now to the drawings and particularly to FIG. 1, there is shown therein, a multi-spindle machine 10 incorporating the preferred embodiment of the machine control system of the present invention. Machine 10 includes a main drive motor 12. The main drive motor operates all of the components on the multi-spindle machine that perform machining operations on the work pieces. The main drive motor operates the components of the machine through a transmission generally indicated 14.

Transmission 14 includes various components including a high speed clutch 16 and a low speed clutch 18. The high and low speed clutches are pneumatically actuated clutches that are selectively actuated to drive a main drive shaft 20 at either a high or a low speed. The speed of the main drive shaft controls the speed at which other components within the machine move as hereinafter discussed. The main drive shaft also has mounted thereon a pneumatic clutch brake 22. Transmission 14 also includes threading clutches 24, the function of which are later described. The pneumatic clutches are controlled through a valve assembly 26 which consists of a group of electrically actuated pneumatic valves.

The main motor 12 is also operative to drive through the transmission a main drum or timing shaft 28. Main timing shaft 28 has a plurality of cams 30 thereon that are operative to actuate plurality of mechanisms within the machine. Similarly, the transmission drives an overhead shaft 32 which also has a plurality of cams 34 thereon. The main motor 12 drives the main timing shaft 28 and overhead shaft 32 in fixed relative connected relation so that the main timing shaft and overhead shaft always have the same relative rotational positions.

Work pieces formed in the multi-spindle machine are carried on six stations 36 located on a main spindle carrying drum 38. It should be understood that machines employing the invention may have other numbers of multiple spindles. Stations 36 consist of rotatable spindles through which the stock, such as bar stock, extends. Raw stock enters the machine at a first position 40 shown adjacent to bottom of the drum. The work pieces then index through each of the other five stations so that a completed part is produced and cut off before the drum returns to the first position. As is conventional with multi-spindle machines, all of the stations rotate the work pieces in the same direction and all of the machining operations occur generally simultaneously.

The machine control system of the present invention includes a controller 42. As shown schematically in FIG. 4 the controller includes a display 44 as well as a plurality of button inputs 46. As shown in FIG. 1 the button inputs preferably include a key pad as well as various dedicated and multiple purpose control buttons.

Figure 4:
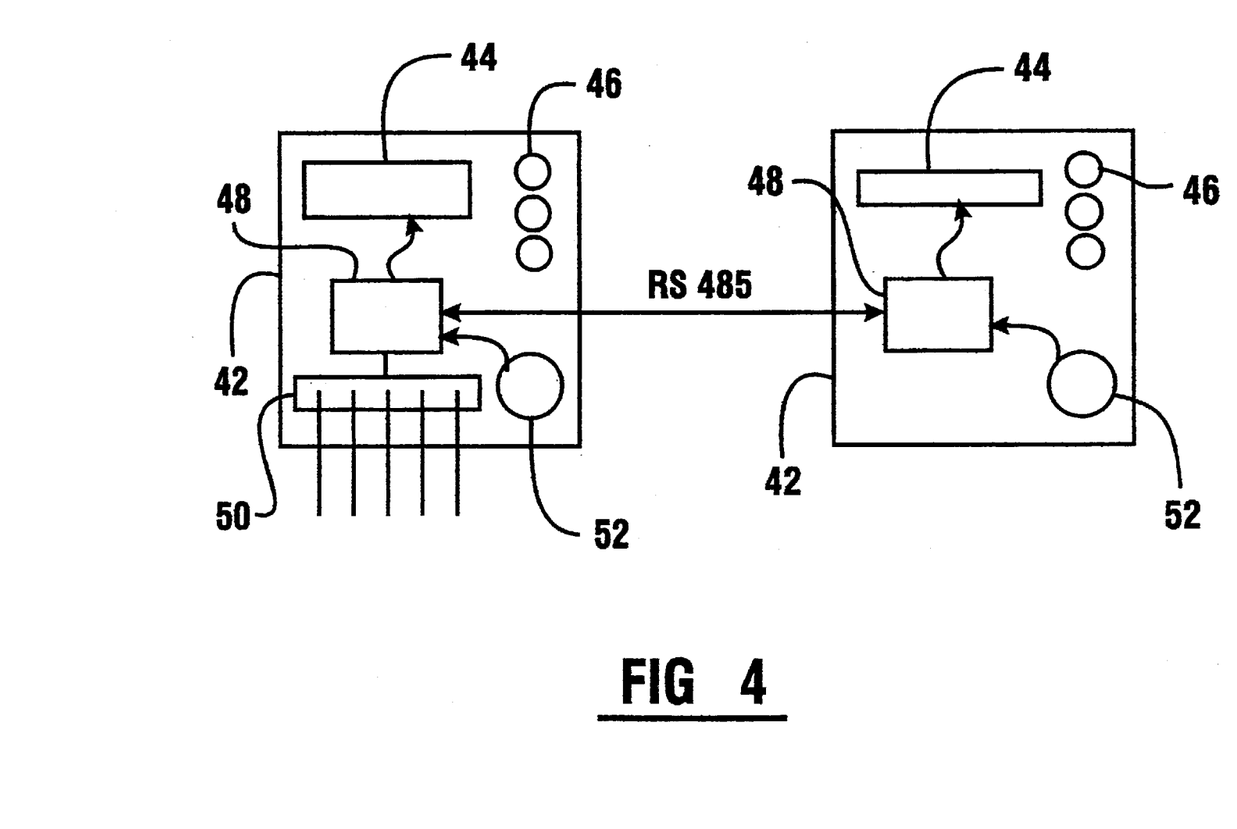
FIG. 4 is a schematic view of the paired controllers used in the preferred embodiment of the machine control system of the present invention.

As shown schematically in FIG. 4 the controller includes a processor 48. The processor drives the display 44. The processor also receives data from sensors and outputs control signals through an interface schematically indicated 50.

In the preferred embodiment of the invention a controller is provided on each side of the machine. This enables an operator or technician to monitor and control the machine from either side. The controllers on each side of the machine are generally identical except that one of the processors is allowed to operate in a slave mode with regard to the other. However, in the event of a malfunction with regard to the "master" processor, the slave processor may either manually or automatically initiate master control.

Because controllers are provided on each side of the machine, each controller includes a "take control" actuator 52. A take control actuator 52, once depressed, enables the button inputs on the particular controller to control the machine. In the preferred embodiment the button inputs on a controller remain operative until the companion controller takes control. However in other embodiments, the button inputs may remain operative for set periods after activation.

For the sake of safety however, certain controls on the controller remain operative at all times. This particularly includes all stop buttons and the emergency stop buttons which enable the operator to stop the machine in an emergency.

During normal operation the controllers communicate via the RS485 serial interface. The display of each controller displays the same information. In the preferred embodiment of the invention the display provides the cycle time of the machine for making the last part that was made on the machine. The display also includes the count of parts that have been made on the machine since the controller was reset.

The display of the controller also provides a continuous indication of the position of the machine. This position is indicated in degrees based on the position of the main timing shaft. This information is useful for purposes of operating the machine as later explained. Finally, the display indicates the run time of the machine. Of course, in other embodiments of the invention, other information may displayed. Further, as hereinafter explained, under certain circumstances the display will also provide other information such as the source of problems or the reasons that has caused the machine to shut down. The display can also be used to display or monitor other functions depending on the programming of the processor and the needs of the user.

As mentioned above, one of the fundamental aspects of the machine control system of the present invention is its ability to prevent damage to the multi-spindle machine as the result of a malfunction. Due to the complexity of multi-spindle machines there are many things that can go wrong. While the main motor 12 on the multi-spindle machine provides power for all of the mechanisms on the machine, there are other systems that are necessary for its operation. Some of these systems are shown schematically in FIG. 2. Without these other systems the multi-spindle machine cannot properly run.

Figure 2:
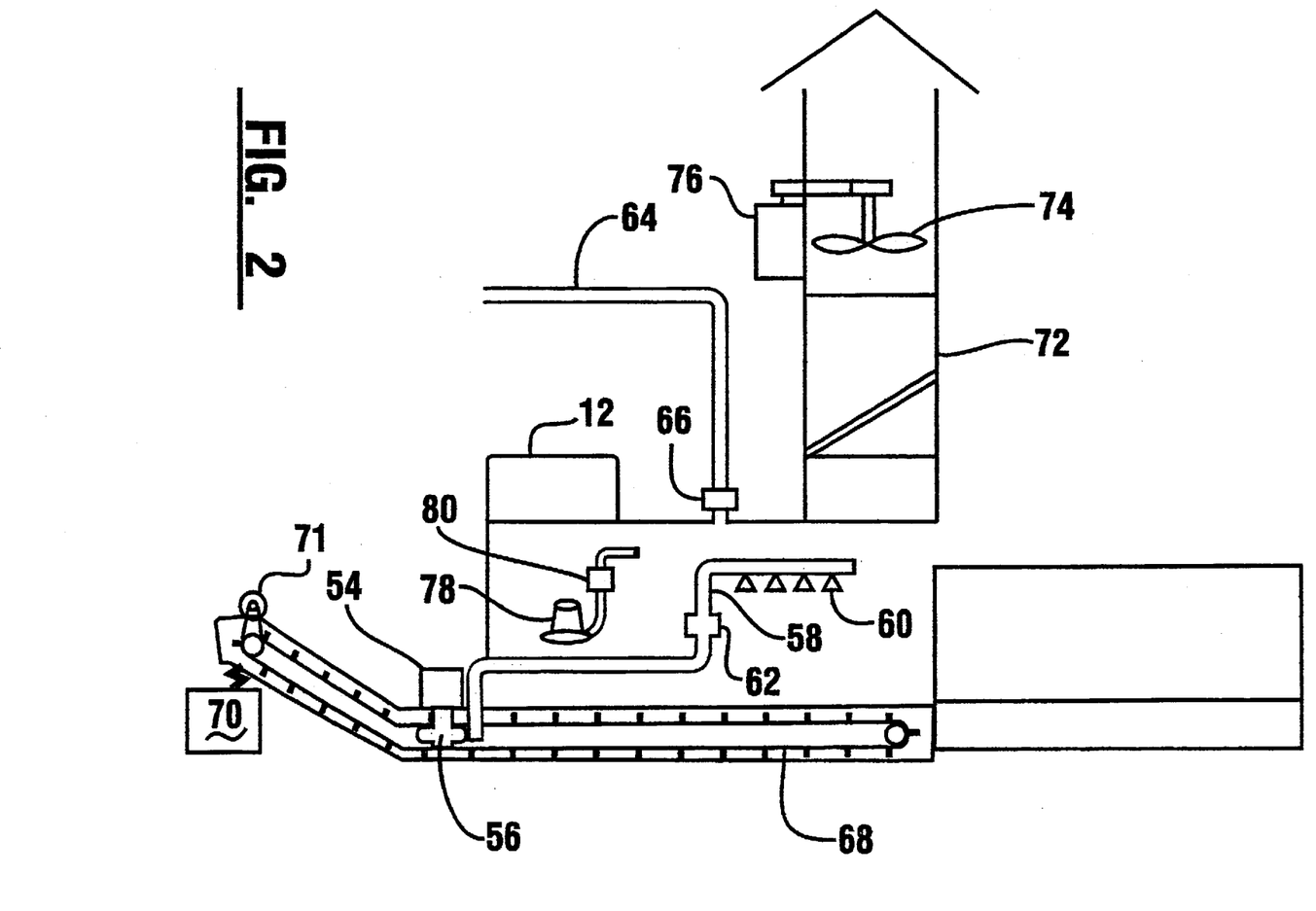
FIG. 2 is a schematic view of the multi-spindle machine including coolant and mist collection systems associated therewith.

Machining coolant generally must be supplied to the work pieces in order to successfully form the parts. The sump of the multi-spindle machine includes a reservoir for such machining coolant which is delivered by a coolant pump 56 driven by a coolant pump motor 54. The coolant pump motor drives the coolant pump 56 which delivers coolant through piping to a manifold 58. The machining coolant is delivered from manifold 58 through nozzles 60 to the areas of the machining operations. Incorporated into manifold 58 is a flow sensing switch 62. Flow sensing switch 62 is preferably a pressure type sensor that will change its output signal in response to a loss of coolant pressure which would be indicative of a failure of the coolant pump or motor.

The sump of the machine which serves as a coolant reservoir includes a chip drag 68. Chip drag 68 is preferably a chain type drag having lateral flights thereon which pull the chips out of the sump and deposit them in a bin 70. The chip drag 68 is driven by a motor 71.

Compressed air is also essential to the operation of the multi-spindle machine. Compressed air is supplied selectively through the solenoid valves to control the clutches. Compressed air is also often used for blowing chips off of the work pieces during selected times in the machine cycle. As schematically shown in FIG. 2 compressed air is delivered to the multi-spindle machine through a compressed air line 64. The compressed air line has mounted therein a pressure sensor 66 which is adapted to change its signal in the event of loss of air pressure.

During machining operations oil mist and fumes are generated. These fumes and oil mist are drawn into a mist collector 72. Air is drawn through the mist collector by a fan schematically shown as 74. Fan 74 is driven by a fan motor 76.

Another important component necessary for the operation of the multi-spindle machine is a lubrication pump. Lubricating oil is needed to lubricate the transmission 14. A lube pump 78 is driven off the main motor and supplies lubricating oil to the transmission. A lube pressure sensor 80 is connected to the outlet of the lube pump. The lube pressure sensor is operable to change its electrical condition in response to a loss of lube oil pressure.

Coolant pump motor 54, chip drag motor 71 and fan motor 76 all are operated using motor starters. Lines from the motor starters are all connected through interface 50 to processor 48 housed inside controller 42. The processor is programmed to sense if these motors are running. Similarly, coolant flow sensor 62, air pressure sensor 66 and lube oil sensor 80 are connected through interface 50 to processor 48. Processor 48 is also programmed to sense if there has been a loss of lube oil coolant or air pressure.

The preferred form of the machine control system of the present invention includes a stock depletion sensor 82 as shown in FIG. 1. Stock depletion sensor 82 is described in detail in my co-pending application filed on Apr. 17, 1995 as Express Mail No. TB817084334US, the disclosure of which is incorporated herein by reference. Stock depletion sensor 82 is an electronic sensor that serves to position the stock that is fed through the spindles in the first position 40 of the drum 38 so that the stock extends the proper distance. The stock depletion sensor also operates to send a signal to the processor through interface 50 each time a new piece of stock has been properly fed in the first position. If the stock should fail to be fed properly the stock depletion sensor will not send a signal to the processor. This failure to receive a signal is detected and identified as a malfunction.

A further significant aspect of the preferred embodiment of the present invention is that it provides protection for the clutches on the machine. This is accomplished by attaching an encoder 84 in operative connection with the main timing shaft 28. In the preferred embodiment the encoder is an absolute 10 bit grey code encoder type that produces signals representative of the angular position and velocity. The encoder is connected to the processor 48 through the interface 50. The encoder is operative to sense the position and velocity of the main timing shaft. The processor is programmed to expect that the encoder output will be consistent with the rotation of the timing shaft at a certain rate. If the main drive motor 12 of the multi-spindle machine is running, but the encoder has not generated the correct motion parameter information within the programmed time period, clutch slippage or binding of the machine is detected.

Figure 3A:
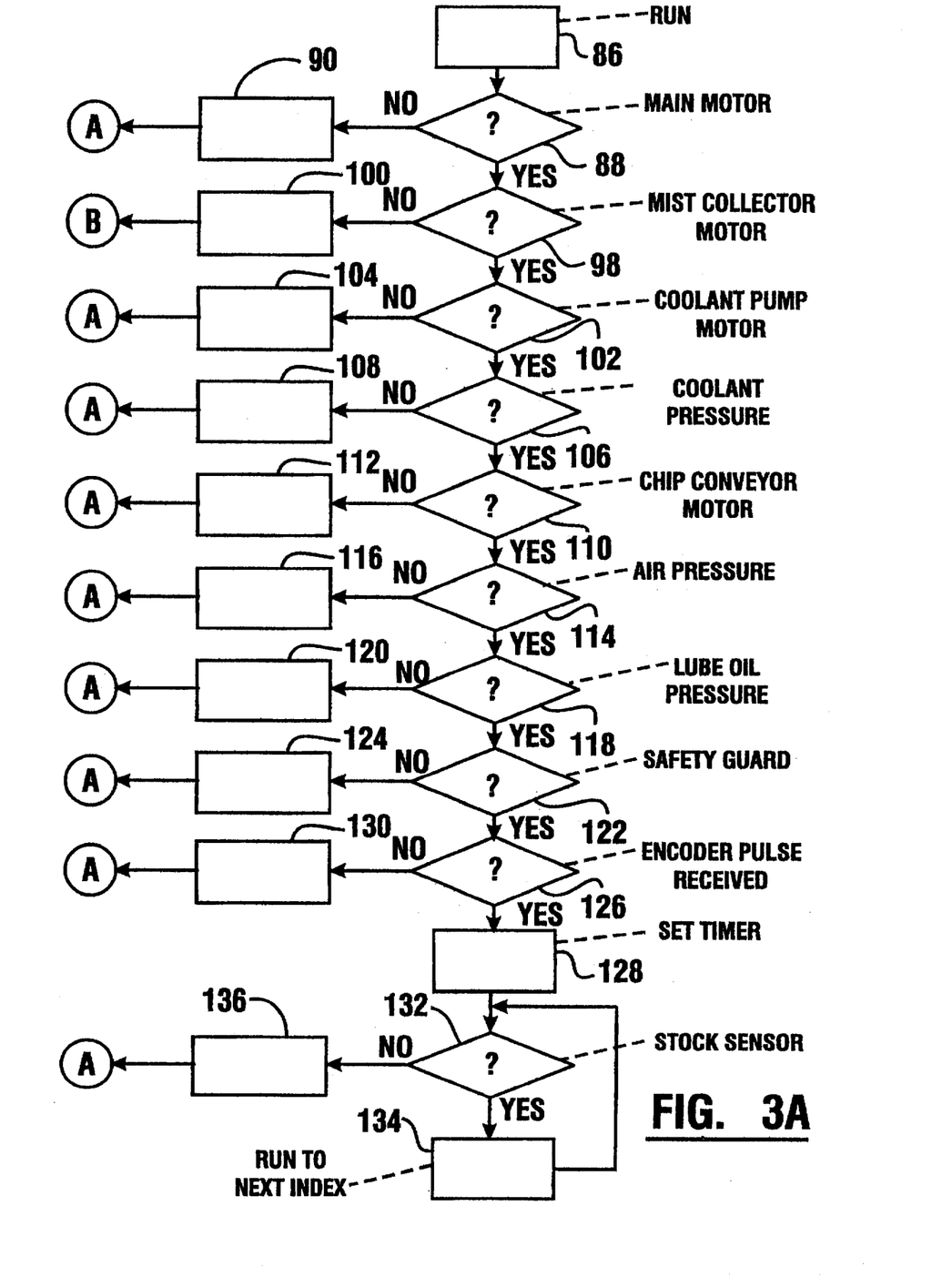
FIGS. 3A and 3B are flow charts of a portion of the control logic executed by the controller of the machine control system.
Figure 3B:
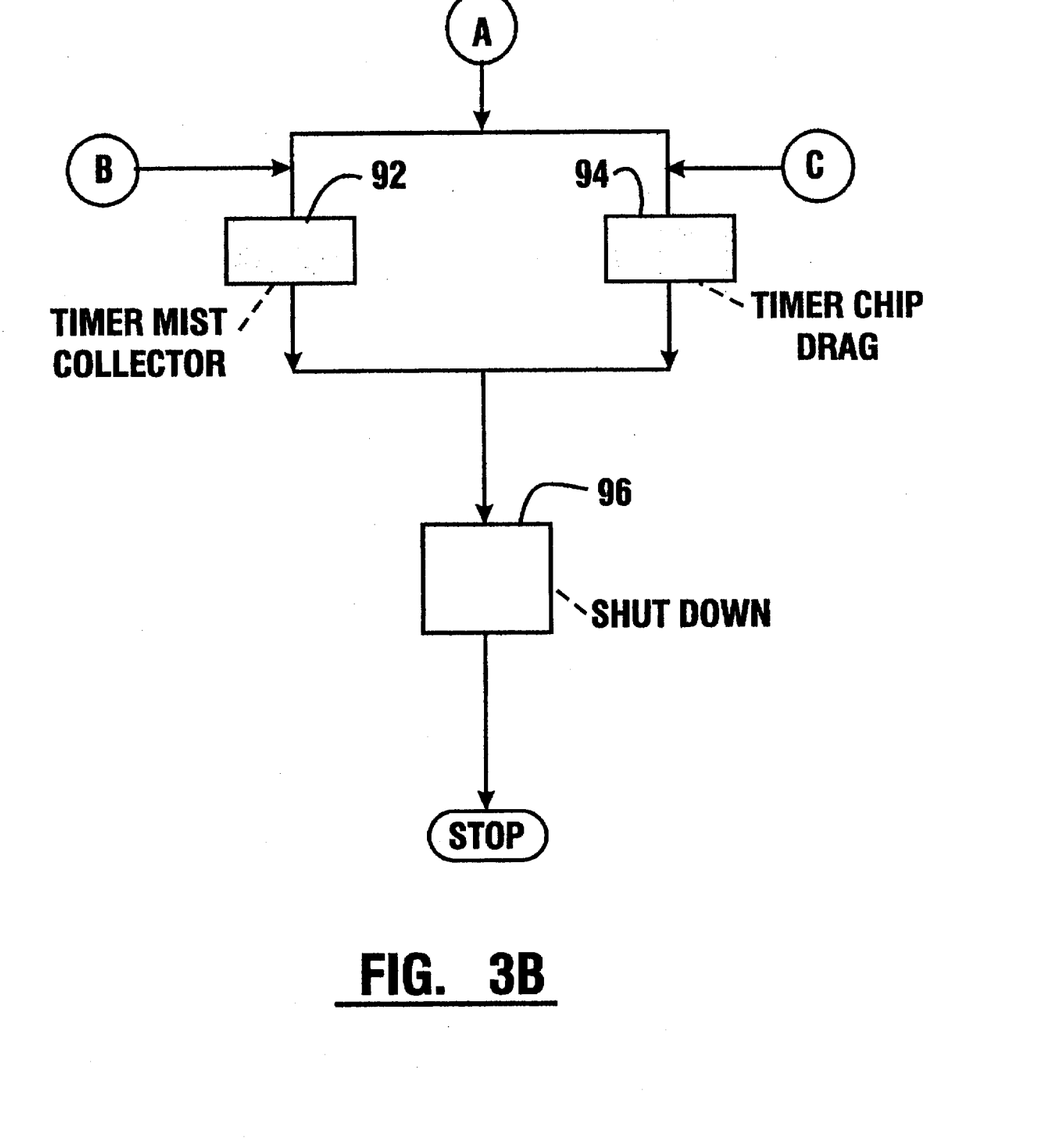

The operation of the controller 12 with regard to protecting the operation of the machine is graphically demonstrated with regard to the flow chart in FIGS. 3A and 3B. As previously discussed, the processor is operative to monitor and receive signals from the starters associated with the motors operating the multi-spindle machine. If the processor receives a signal indicative of the shut down of the main motor at decision point 88 the processor executes a step 90 which is operative to cause the display of the controller to present indicia representative of a main motor shut down. In such event the processor is operative to set timer 92 which is operative to cause the mist collector motor to run for a predetermined period. A timer 94 is also set. Timer 94 causes the chip drag motor to continue to run for a set period. After setting these timers the processor then executes a step 96 which shuts all other systems down associated with the multi-spindle machine except the controller. Allowing the mist collector motor and the chip drag conveyor motor to run for a predetermined period of several minutes each helps to avoid the release of contaminants into the factory atmosphere and to avoid a significant collection of chips in the sump in the machine. However after the time periods these items shut down. This avoids the waste of electricity that would result from ongoing operation of these items.

Referring again to FIG. 3A. the processor also continuously checks the status of the mist collector motor 76 at decision point 98. If the motor should fail to be operating the processor executes a step 100 which causes the controller display to indicate this failure. The processor then proceeds to allow the chip drag motor to run for the predetermined period and complete the shut down sequence.

A similar decision point occurs at 102 where the processor checks for operation of the coolant pump motor. If a failure is indicated, step 104 causes the appropriate fault code to be displayed. Similarly step 106 is a decision point related to the coolant flow. If the flow sensor 62 fails to detect coolant flow, the processor causes the failure to be indicated at step 108.

The processor checks for operation of the chip conveyor motor at decision point 110. If a failure is detected a fault code is indicated on the display through execution of a step 112 and the shut down sequence is completed without the operation of the timer associated with the chip conveyor motor.

At decision point 114 the processor checks for appropriate air pressure at sensor 66. Upon failing to receive an indication of suitable pressure the processor executes step 116 causing the display to indicate this failure and to complete the shut down sequence. Similarly at decision point 118 the processor checks for appropriate lube oil pressure, displays the appropriate fault code at step 120 if insufficient pressure is present and completes the shut down sequence.

As discussed hereafter, multi-spindle machines include a number of safety guards including appropriate guarding for a manually movable crank handle shaft that is used during set up of the machine. Electrical switches are desirably positioned adjacent to such safety guards so that the machine cannot be run if the guards are not in place. The processor checks for the presence of one or more guards at decision point 122 and if any of the guards have been removed, indicates the fault code at step 124. It should be understood by those skilled in the art however, that in the preferred embodiment the processor actually checks for the presence of numerous guards and indicates the exact guard which has been removed on the display.

If the multi-spindle machine is operating properly encoder 84 detects the speed of main timing shaft 28 in response to the rotation thereof. The processor 48 senses for the receipt of encoder transition data at a decision point 126 and with the receipt of each data transition resets a timer 128 to establish a time by which the next data transition should be detected. If the next data transition is not received timely, a problem is indicated and the processor executes a step 130 which causes a lock up fault code to be displayed.

The processor also receives the signals from the stock depletion sensor 82 and is operative to shut down the machine in the event that the stock depletion sensor does not send a signal within the appropriate position of the timing shaft. After the main drum 38 is indexed the processor senses the receipt of a signal from sensor 82 at a step 132. This is indicative that an appropriate length of stock has been fed forward at the first station 40 to make the next part. The processor then waits at step 134 to see if another signal from the stock depletion sensor is received after the next time drum 38 indexes. If no signal is received after the drum indexes, it indicates that the stock in the next position has not been moved properly forward which is representative that the station is out of stock. In response, the processor executes a step 136 which causes the display to indicate that the stock is depleted and the machine completes its shut down sequence.

Figure 9:
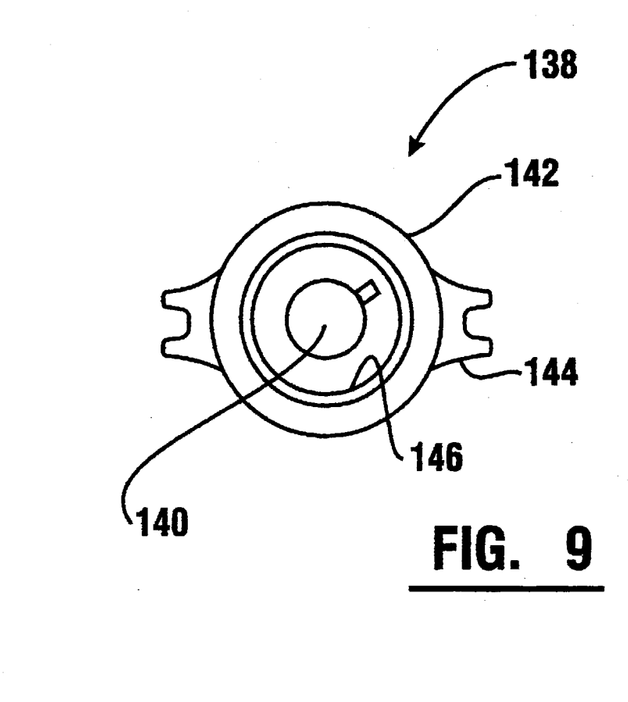
FIG. 9 is a plan view of a portion of a machine shaft safety cover used in conjunction with the preferred embodiment of the present invention.
Figure 10:
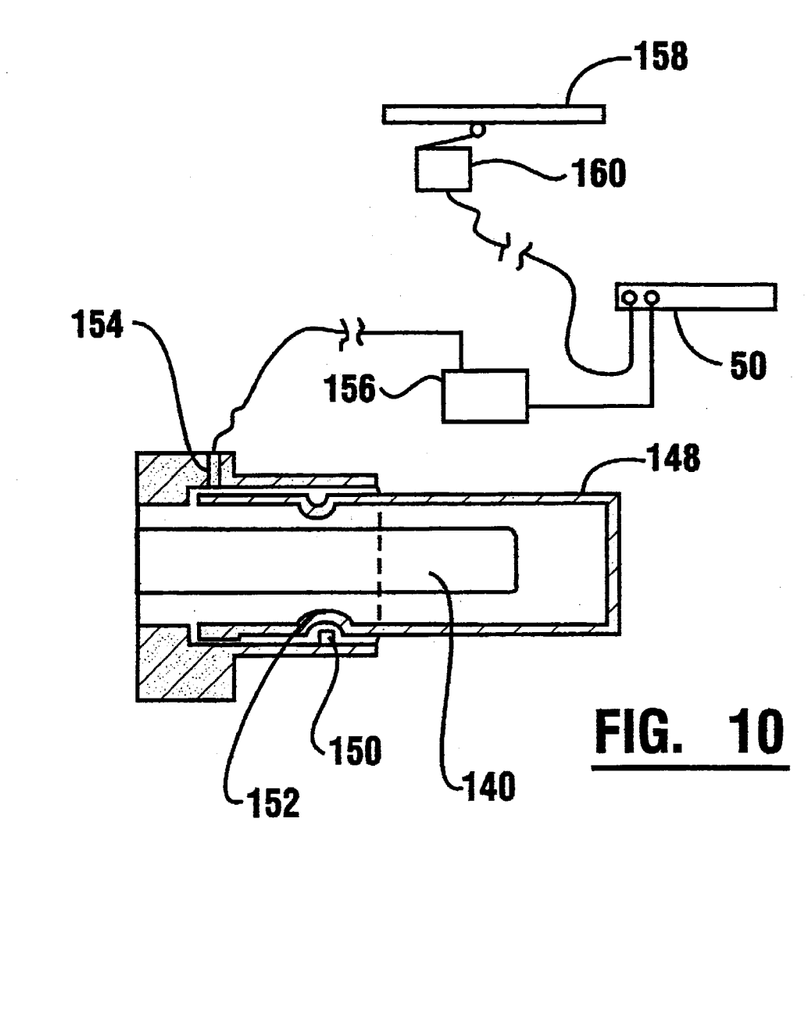
FIG. 10 is a side sectional view of a shaft cover of FIG. 9 in connection with a schematic view with another safety switch and machine guard.

The system of the present invention is particularly useful in that it causes the machine to shut off in the event that any of the guards are removed. An example of such a guard is shown in FIGS. 9 and 10 which shows a guard generally indicated 138. Guard 138 is operative to protect a manual crank shaft 140. Crank shaft 140 generally extends from the side of the multi-spindle machine. Shaft 140 may have a removable handle attached thereto which the operator or set up technician can use to set up the multi-spindle machine. In doing this the technician manually rotates the shaft which moves the timing shafts. In this way the technician is able to set the limits for movement of the various components on the machine while not under power, thus avoiding the risk of damage.

Guard 138 includes a body 142 having ears 144 which are used to attach it to the machine. Body 142 includes a bore 146. Bore 146 is adapted to receive hollow sleeve 148. A spring loaded projection 150 extends radially inward in the bore and is engagable with a circumferentially extending detent 152 in the exterior of the sleeve.

Proximity sensing element 154 is mounted in the body 142. Sensing element 154 is preferably an inductance type sensor or other suitable sensor capable of sensing the absence of sleeve 148 within the bore. Sensing element 154 is connected to a signal amplifier and conditioner 156 which is preferably housed in the same enclosure as a processor. Amplifier 156 is connected to interface 50. In operation if sleeve 148 is removed exposing the crank shaft 140 while the machine is running, decision point 122 will cause the multi-spindle machine to shut down.

As previously discussed, conventional machine guards such as that shown schematically at 158 have limits switches such as 160 or other sensors adjacent thereto. In the event that one of the guards is removed while the machine is running, the processor will likewise operate to shut the machine down.

The preferred embodiment of the machine control system of the present invention is also operable to avoid damage to the machine by making sure that tooling in the machine has gone to the appropriate full stroke and has returned to the original position. By ensuring that such tools return to their original positions, it is assured that if the machine attempts to index to the next position no damage will occur. This feature is schematically shown in FIGS. 8A through 8C.

Figure 8A:
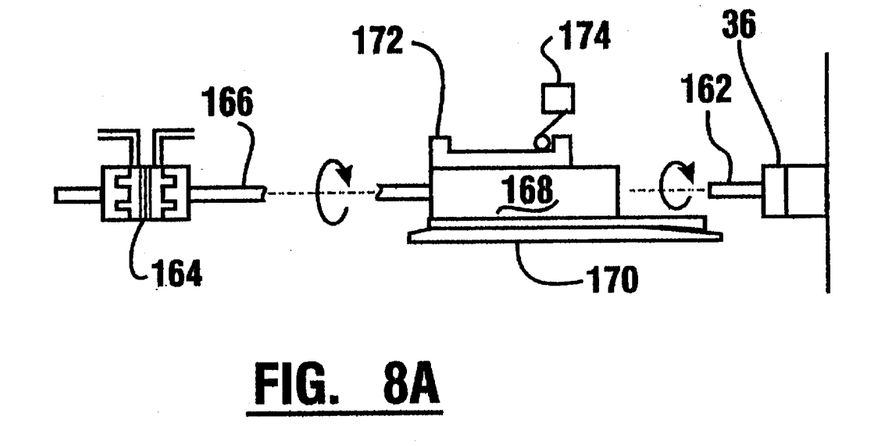
FIGS. 8A, 8B, and 8C are schematic views of a threading spindle and slide connected by a threading clutch being used to thread a work piece.

A station 36 on drum 38 is shown holding a workpiece or stock 162 in FIG. 8A. The stock is held in a collet in the spindle as previously discussed and rotates in the direction of the arrow as shown. For purposes of illustration with regard to a threading operation, a threading clutch assembly 164 is shown. A threading clutch assembly is actually a pair of clutches each of which may be selectively connected to different gears. Depending on which of the pair of threading clutches is engaged, the threading clutch output shaft 166 will rotate in the same direction as stock piece 162 but at either a slower or faster rate relative thereto. As will be understood by those skilled in the art, by selectively engaging the threading clutches, a threading tool which is rotated in response to output shaft 166 can be used to produce either right or left hand threads on stock piece 162. This is accomplished by rotating the threading tool at a speed either slower or faster than the stock piece. Similarly, by changing the engaged threading clutch, the threading tool can be backed off the stock piece once the threads have been formed.

Figure 8B:
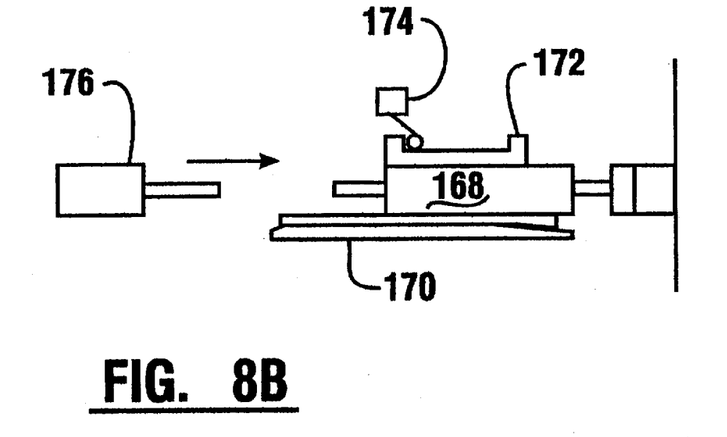
Figure 8C:
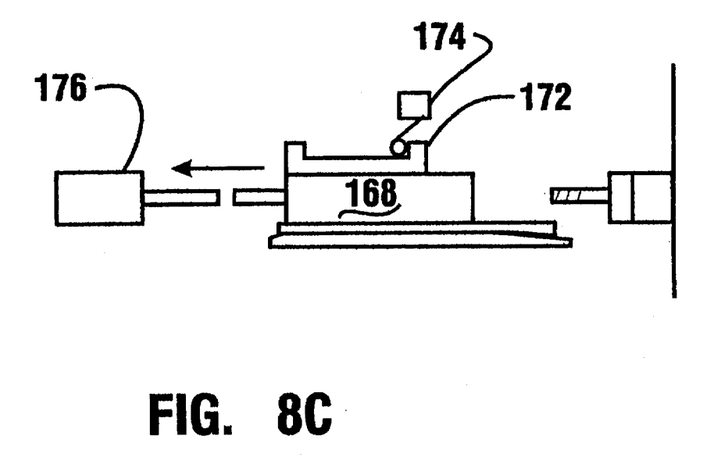

The threading process is graphically illustrated in FIGS. 8A through 8C. A threading tool 168 is schematically illustrated and is guided on a slide 170. A switch actuator 172 is attached to the threading tool 168. The threading tool is shown in the fully retracted position shown in FIG. 8A. The switch actuator engages a switch 174 so as to indicate that the threading tool is in the fully retracted position.

As the multi-spindle machine cycles, the threading tool 168 is moved to engage the stock piece 162 by movement on slide 170. This is accomplished using an actuator such as pneumatic cylinder 176 which is schematically shown. The threading tool moves to engage the stock piece until the switch 174 is moved to the fully forward, full stroke position by the switch actuator 172 as shown in FIG. 8B.

Once the threading tool 168 has been moved to the fully forward position, the cylinder 176 changes direction in response to control signals from the processor or other appropriate control logic to return the threading tool to its original position wherein the switch actuator 172 engages the switch 174 to indicate that the threading tool is again in the fully retracted position. Once in the fully retracted position the threading operation is complete and the threading tool is sufficiently disposed from the stock piece and spindle so that the main drum may index.

In the preferred embodiment of the present invention the processor monitors the signals generated by switch 174 to verify that signals are received indicating that the threading tool has gone to the fully forward position shown in FIG. 8B and is returned to the fully retracted position shown in FIG. 8C. This ensures that the tool has done its work and is now out of the way before the processor allows the machine to proceed to the next step in which the drum is indexed. Failure by the processor to detect the full movement of the tool causes the processor to display a fault condition. The controller then causes the machine to shut down in a manner similar to that previously described for the other sensed fault conditions.

It is to be understood that while the foregoing discussion relates to a threading tool, similar monitoring may be conducted with regard to other types of tool slides. This includes tool slides which extend perpendicular to the axis of the stock pieces as well as other slides that perform other machining functions on the work piece and then retract. Any number of tool slides may be monitored in the foregoing manner to assure that the machine is operating properly at all times.

A further fundamental advantage of the invention is its ability to decrease cycle times and increase production rates. As previously discussed, there are only certain portions of each cycle of the machine in which the tools are actually performing work on the stock pieces. At other times during the machine cycle the tools are moving to or from the locations in which they form the parts. In normal operation it is advisable to run the main drive shaft of the machine which controls the speed of all these components at a high speed while they are not performing work and at a low speed while they are forming the parts. In operation these times for making the high speed shift and the low speed shift are correlated with the position of the main timing shaft 28. During normal machine cycling the main drive shaft may run in high speed between 360° to 255°. At 255° the speed of the shaft usually drops to the lower speed until 360° is again reached.

While the foregoing positions of the high and low speed shifts at 255° and 360° is "normal", this is not necessarily optimum for all parts. One of the fundamental advantages of the system of the present invention is that the operator is enabled to control the position of the high and low speed shifts so as to achieve the fastest production rate possible for the particular part.

Figure 6:
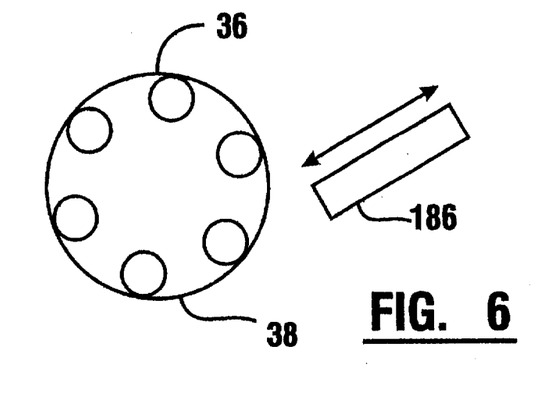
FIG. 6 is a schematic view of the main drum of a multi-spindle machine and a tool slide.
Figure 7:
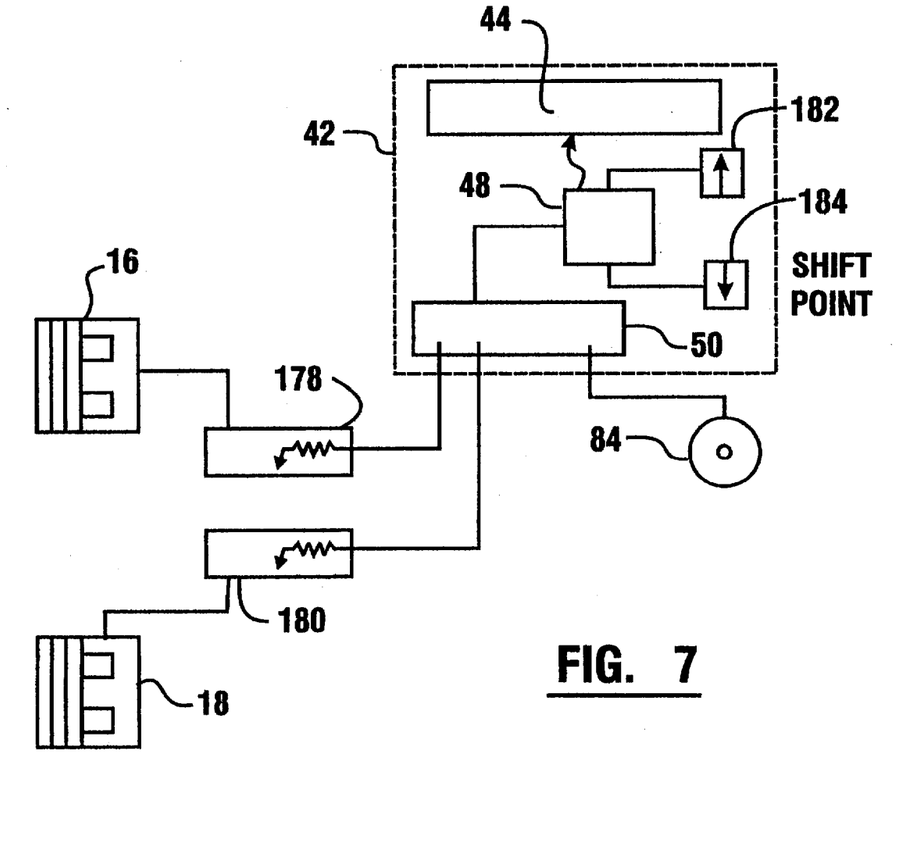
FIG. 7 is a schematic view of the controller and components which are used to control the high and low shift points of the multi-spindle machine.

As shown in FIGS. 6 and 7, in the system of the present invention the controller 42 provides for incremental manual adjustment of the high and low shift points. As previously discussed, the encoder 84 communicates through the interface 50 with the processor 48. The processor 48 controls solenoid valves 178 and 180 which engage the high speed clutch 16 and the low speed clutch 18 respectively. The processor is also operative to display the instantaneous position of the main timing shaft 28 as received from the absolute encoder 84 on the display 44. By actuating button inputs 182 and 184 on the controller 42, an operator is able to change the points in the machine cycle when the high and low shift points occur.

By using this feature an operator is enabled to precisely adjust how far a tool on a slide, such as slide 186 shown schematically in FIG. 6, will move toward engagement with the work piece before the machine will slow to the appropriate speed for machining. Likewise the operator can set the optimum speed when the machine should again start moving faster so as to move the work pieces to the next cycle. By changing the high and low shift points an operator can produce parts at the fastest rate appropriate for the particular set up in part being made. In the preferred form of the invention, the operator is enabled to modify the shift points in one degree increments.

A further feature of the preferred embodiment is that if the multi-spindle machine is started when the machine is in the high speed portion of the cycle the processor will cause the low speed clutch to be engaged for a fixed period before the high speed clutch engages. Preferably this period is for a period of 5° of the total 360° machine cycle. This avoids an operator or set up technician erroneously starting the machine and causing an unexpected crash due to rapid tool or mechanism movement.

As previously discussed, the preferred embodiment of the machine displays the cycle time of the last made part. In this manner if the operator adjusts the high and low shift points, the operator immediately sees the result on productivity from the display. Obviously any undesirable modification will result in a longer cycle time. In contrast a shorter cycle time indicates that a desirable modification has been made. The machine operator may continue to make fine adjustments to the high and low shift points so as to "fine tune" the machine. Such fine tuning may be appropriate during the course of running even the same part so as to adjust for changes in materials, tool wear and the like.

The machine control system of the preferred embodiment also enables the controller to produce output signals during selected portions of the machine cycle. These programmable outputs can be used to operate devices that only need to be run during a portion of the machine cycle. The programming is done using the user interface of the controller. An example of such a device is a compressed air chip blow off. By only actuating the blow off when needed, energy savings is achieved.

Figure 5:
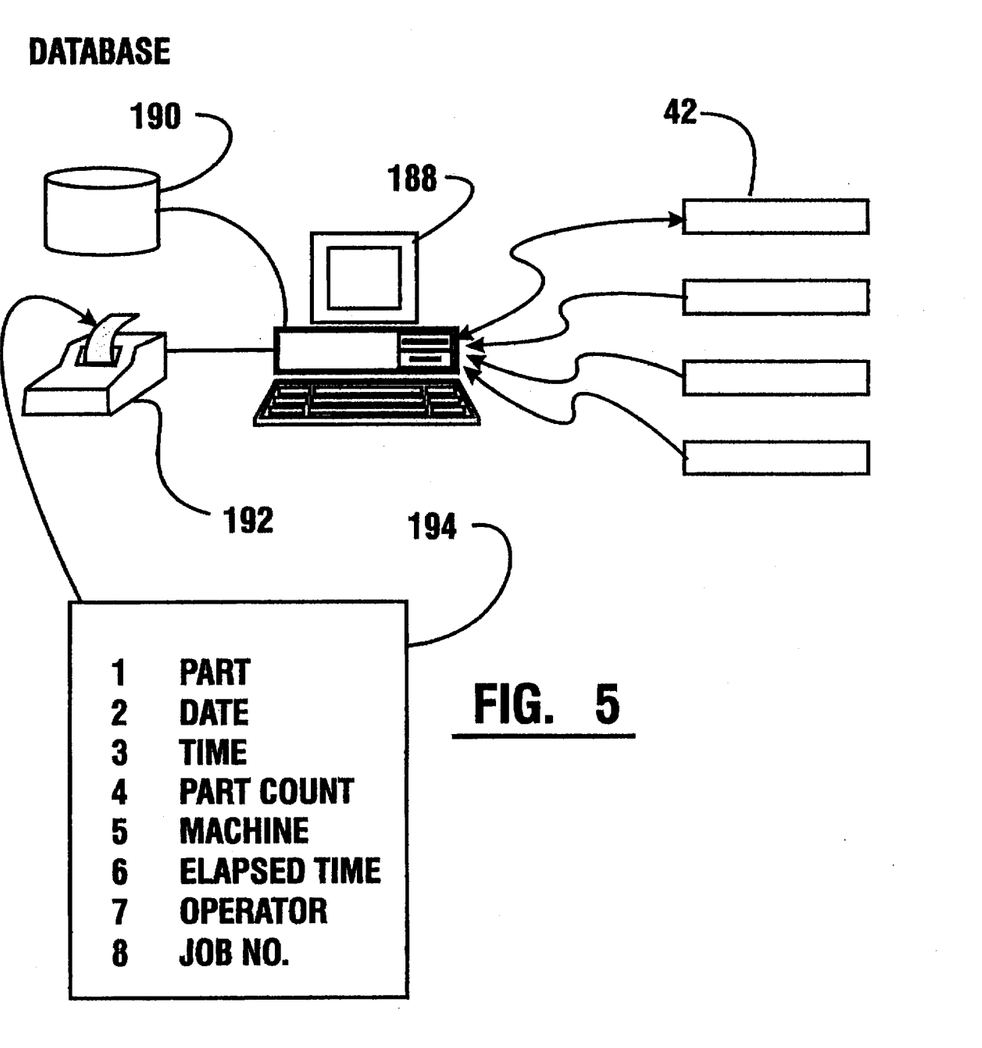
FIG. 5 is a schematic view of the administrative workstation connected to the controllers of the multi-spindle machine.

A further fundamental advantage of the present invention is that it enables the monitoring of production and facilitates the accurate calculation of costs for producing a part. As shown in FIG. 5, in the preferred form of the invention, the controller communicates through data communication cable or through a local area network with an administrative workstation 188. The administrative workstation is preferably a personal computer which includes a processor and a memory, an output device such as a screen and an input device such as a keyboard. The administrative workstation 188 is also connected to a system printer 192. The system printer is suitable for printing reports in a manner hereinafter described.

In the preferred form of the invention the controller is suitable for monitoring the use of tools by pressing an appropriate sequence of button inputs on the controller. A technician can program the processor to give an indication on the display when a particular tool has been used for a set number of cycles. This can be particularly useful when a tool has a limited known tool life in a particular job. Similarly, if the technician changes a tool, the technician can reset the value for the number of cycles for that particular tool in the processor to zero.

The information on the number of cycles that a particular tool provides on a particular machine and in a particular operation is transferred from the controller 42 to the administrative workstation 88. This information is stored in the database 190 for future use, such as for determining the life expectancy of particular tools. This enables the company operating the multi-spindle machines to conduct statistical analysis concerning tool life and to compare and contrast other parameters such as set-up conditions and particular machines so as to evaluate other factors that may have a bearing on how long tools last.

In the preferred form of the invention the controller is also used for data input by the machine operator. When a job is started the controller is programmed to have the operator to input the particular job number or other identifying number that is to identify the particular part and/or order associated with the component to be manufactured on the multi-spindle machine. This information identifies the type of part that is being made.

Also during start-up the controller prompts the operator through the display to input operator-identifying data. This tells the machine which operator is running the machine. If security is required, the controller may be programmed to accept only operator I.D. numbers that are secret and known only to selected operators. This ensures that the appropriate person is operating the machine.

The information concerning the job number, the operator I.D., as well as the parts cycle time, number of parts produced, the running time of the machine, and the real time required to make the parts is constantly available via the data communications link to the administrative workstation and stored in the database. At the completion of a shift or the end of the job, the administrative workstation can be used to print off a report on the printer. A typical example of the format of such a report 194 is shown in FIG. 7. Such a report may include the part as well as the date it was made and the time that the report is printed. The report may further include a part count, the machine, the amount of time that it took to produce the parts, the operator I.D. number and the job number. This written report can be kept with the parts as they are sent for further processing or can be used to identify a batch of parts for quality control purposes. Further, the information captured in the database may be used to determine factors such as the actual time required to produce the parts. This data may be used to refine cost information and to verify that appropriate amounts are being charged to customers for producing the parts. In addition, the system also enables the owner of multi-spindle machines to monitor the performance of particular machines and operators. This enables an objective method for evaluation of operators as well as an indication of problems associated with particular machines.

Of course while the data elements shown in report 194 are few in number, it will be recognized by those skilled in the art that additional data may also be captured from the system so as to satisfy the system owner's particular needs.

Thus the new machine control system of the present invention achieves the above-stated objectives, eliminates difficulties encountered in the use of prior devices and systems, solves problems and attains the desirable results described herein.

In the foregoing description, certain terms have been used for brevity, clarity and understanding, however, no unnecessary limitations are to be implied therefrom because such terms are for descriptive purposes and are intended to be broadly construed. Moreover, the descriptions and illustrations herein are by way of examples and the invention in not limited to the details shown and described. Further in the following claims any feature that is described as a means for performing a function shall be construed as encompassing any means capable of performing that function and shall not be limited to the particular means shown in the foregoing description or mere equivalents.

Having described the features, discoveries and principles of the invention, the manner in which it is constructed and operated and the advantages and useful results attained; the new and useful structures, devices, elements, arrangements, parts, combinations, systems, equipment, operations and relationships are set forth in the appended claims.

I claim:

1. A multiple spindle machine for machining a plurality of stock pieces wherein each stock piece is positioned within one of said spindles, wherein said stock pieces are simultaneously machined by components of said machine comprising:

a timing shaft, wherein rotation of said timing shaft is operative to initiate and terminate machining of each of said stock pieces by said components;

a main motor operatively driving both said timing shaft and said components, whereby said stock pieces are machined;

an encoder in operative connection with the timing shaft wherein said encoder senses rotation thereof; and a controller in operative connection with said encoder and said main motor, wherein said controller shuts off said main motor when the speed of rotation of said timing shaft falls below a value.

2. The multi-spindle machine according to claim 1 wherein said multiple spindle machine further comprises a coolant pump, said coolant pump being driven by a coolant pump motor, and wherein said coolant pump motor is in operative connection with said controller, and wherein said controller is operative to shut off said main motor responsive to cessation of operation of said coolant pump motor.

3. The multi-spindle machine according to claim 1 wherein said multiple spindle machine further comprises a coolant delivery manifold whereby machining coolant flows therethrough, and further comprising a coolant flow sensor in flow sensing connection with said manifold, and wherein said coolant flow sensor is in operative connection with said controller, and wherein said controller is operative to shut off said main motor responsive to said coolant flow sensor, whereby said main motor is shut off when insufficient flow of machine coolant is detected.

4. The multiple spindle machine according to claim 1 and further comprising a lube oil pump, whereby said lube oil pump supplies lubricating oil to components of said multi-spindle machine, and further comprising a lube oil flow sensor in flow sensing relation with said lube oil pump, and wherein said lube oil flow sensor is in operative connection with said controller, and wherein said controller is operative to shut off said main motor responsive to said lube oil sensor, whereby said main motor is shut off when insufficient flow of lube oil is detected.

5. The multiple spindle machine according to claim 1 and further comprising pneumatic actuated components on said machine, and further comprising an air pressure sensor in sensing connection with and air supply supplying said pneumatic actuated components, wherein said air pressure sensor is in operative connection with said controller, whereby said controller is operative to shut off said main motor responsive to insufficient air pressure.

6. The multiple spindle machine according to claim 1 and further comprising a safety guard, and further comprising a safety guard sensor in sensing connection with said safety guard, and wherein said safety guard sensor is in operative connection with said controller, whereby said controller is operative to shut off said main motor responsive to removal of said safety guard.

7. The multiple spindle machine according to claim 1 and further comprising a stock feeding mechanism, and a stock sensor, wherein said stock feeding mechanism is operative to cause stock to actuate the stock sensor upon proper feeding, and wherein said stock sensor is in operative connection with said controller, whereby said controller is operative to shut off said main motor responsive to a failure of said stock sensor to sense proper feeding of said stock.

8. The multiple spindle machine according to claim 1 wherein said multi-spindle machine further comprises a chip conveyor, whereby said chip conveyor is operative to remove chips from said machine, and wherein said chip conveyor is driven by a chip conveyor drive motor, and wherein said chip conveyor drive motor is in operative connection with said controller, whereby said controller is operative to shut down said main motor responsive to cessation of operation of said chip conveyor drive motor.

9. The multiple spindle machine according to claim 1 and further comprising a mist collector in operative connection with said multi-spindle machine, wherein said mist collector comprises a mist collector motor, said motor in operative connection with said controller, whereby said controller is operative to shut down said main motor responsive to cessation of operation of said mist collector motor.

10. The multiple spindle machine according to claim 1 and further comprising a threading tool, and wherein said threading tool is movably mounted on a slide, and further comprising a tool position sensor in operative connection with said threading tool wherein said position sensor senses a position of said tool, and wherein said sensor is in operative connection with said controller, whereby said controller is operative to shut down said main motor if said tool position sensor fails to detect said tool in a position.

11. The multiple spindle machine according to claim 10 wherein said tool position sensor is operative to sense said threading tool in a full stroke position and in a retracted position, and wherein said controller is operative to shut down said main motor responsive to failure to sense said threading tool in the full stroke position and subsequently in the retracted position.

12. The multiple spindle machine according to claim 1 and further comprising a mist collector and wherein said controller is operative to cause said mist collector to operate for a pre-determined period after said main motor is shut down.

13. The multiple spindle machine according to claim 1 and further comprising a chip conveyor whereby said chip conveyor removes chips from said machine, and wherein said controller is operative to cause said chip conveyor to run for a predetermined time after said main motor is shut down.

14. The multiple spindle machine according to claim 1 wherein said controller further comprises operator controls for controlling said multi-spindle machine, and wherein said controls comprise a take control actuator device, and wherein said controller further comprises a processor, and wherein said multi-spindle machine further comprises at least two controllers at spaced apart locations on said machine, and wherein said processors in said controllers are connected through an interface, and wherein said take control actuator on a first of said controllers is operable to have said controls on said first controller control the operation of said machine.

15. The multiple spindle machine according to claim 14 wherein said controllers communicate through a serial communications interface.

16. The multiple spindle machine according to claim 1 wherein said controller includes a processor and a display, and wherein said processor is in operative connection with a plurality of sensors, and wherein signals from any one of said sensors are operable to shut-down said main motor, and wherein said processor is programmed in the event of such shutdown to cause said display to display data representative of said one sensor causing said shut down.

17. The multiple spindle machine according to claim 1 and wherein said controller comprises a processor and operator inputs in connection with said processor, and wherein said processor determines a position of said timing shaft from said encoder, and wherein said machine further comprises at least one tool movable responsive to rotation of at least one drive shaft, and wherein said drive shaft is in connected relation with said timing shaft, and wherein a clutch pair is in operative connection with said drive shaft and said main motor, and wherein said clutch pair is operative to change the speed of said drive shaft from a high speed to a relatively low speed and vice-versa, and wherein said clutch pair is in operative connection with said controller, whereby said controller is operative to shift said drive shaft from high to low speed and vice-versa, and wherein said high and low speed shifts are variable by actuation of said operator inputs.

18. The multiple spindle machine according to claim 1 wherein said controller comprises a processor and a display, and wherein said processor is operative to calculate a machine cycle time of said machine and to cause said display to output said machine cycle time.

19. The multiple spindle machine according to claim 1 wherein said controller comprises a processor, a display and operator inputs, and wherein said processor is operative to count machine cycles based on inputs from said encoder, and wherein said machine further comprises at least one tool, and wherein said processor is programmable through said operator inputs to indicate on said display when a programmed number of machine cycles for said tool has been reached.

20. The multiple spindle machine according to claim 1 wherein said controller comprises a processor and operator inputs, and further comprising an administrative workstation in communication with said processor, said administrative workstation including a workstation processor and memory, and wherein information representative of a type of part being produced on said machine is inputable to said controller through said operator inputs, and wherein said processor is operable to count machine cycles, and wherein said administrative workstation is operable to store data in the workstation memory representative of the parts, the number of parts made and calculates the elapsed time to make said parts, and further comprising an output device connected to said administrative workstation, wherein said output device is operable to output a report responsive to said workstation processor and memory, said report including data representative of the part type, the number of parts made and the elapsed time.

* * * * *